United States Patent
Modarres Razavi et al.

(10) Patent No.: US 11,632,652 B2
(45) Date of Patent: Apr. 18, 2023

(54) SERVER, RADIO NETWORK NODE AND METHODS IN A WIRELESS COMMUNICATIONS NETWORK

(71) Applicant: Telefonaktiebolaget LM Ericsson (publ), Stockholm (SE)

(72) Inventors: Sara Modarres Razavi, Linköping (SE); Fredrik Gunnarsson, Linköping (SE); Gino Masini, Stockholm (SE); Ritesh Shreevastav, Upplands Vasby (SE); Martin Israelsson, Spånga (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 685 days.

(21) Appl. No.: 16/339,066

(22) PCT Filed: Jan. 24, 2019

(86) PCT No.: PCT/SE2019/050049
§ 371 (c)(1),
(2) Date: Apr. 3, 2019

(87) PCT Pub. No.: WO2019/160465
PCT Pub. Date: Aug. 22, 2019

(65) Prior Publication Data
US 2021/0385618 A1   Dec. 9, 2021

Related U.S. Application Data

(60) Provisional application No. 62/631,544, filed on Feb. 16, 2018.

(51) Int. Cl.
*H04W 4/029* (2018.01)
*G01S 5/02* (2010.01)

(52) U.S. Cl.
CPC .......... *H04W 4/029* (2018.02); *G01S 5/0236* (2013.01)

(58) Field of Classification Search
CPC ....... H04W 4/029; H04W 64/00; H04W 4/02; G01S 5/0236; G01S 19/05
See application file for complete search history.

(56) References Cited

U.S. PATENT DOCUMENTS

2013/0223626 A1   8/2013   Edge et al.
2014/0080489 A1   3/2014   Siomina
2019/0253996 A1*  8/2019   Kelley .................... H04W 4/06

FOREIGN PATENT DOCUMENTS

JP   2015097328 A   5/2015
KR   1020140113682 A   9/2014
(Continued)

OTHER PUBLICATIONS

Indian Examination Report for Indian Application No. 202017027595 dated Jul. 13, 2021, 7 pages.
(Continued)

*Primary Examiner* — Marcos L Torres
(74) *Attorney, Agent, or Firm* — Sage Patent Group

(57) ABSTRACT

A method performed by a server for assisting a radio network node to handle a set of positioning assistance data for positioning one or more User Equipments, UEs, in a wireless communications network is provided.
Based on importance, the server determines a priority associated to the respective positioning assistance data out of the set of positioning assistance data.
The server assists the radio network node by sending the set of positioning assistance data, and information about the determined priority associated to the respective positioning assistance data. The determined priority enables the radio network node to determine a schedule for broadcast of at least some of the respective positioning assistance data out (Continued)

---

301. BASED ON IMPORTANCE, DETERMINE A PRIORITY ASSOCIATED TO THE RESPECTIVE POSITIONING ASSISTANCE DATA OUT OF THE SET OF POSITIONING ASSISTANCE DATA

302. ASSIST THE RADIO NETWORK NODE BY SENDING THE SET OF POSITIONING ASSISTANCE DATA, AND INFORMATION ABOUT THE DETERMINED PRIORITY ASSOCIATED TO THE RESPECTIVE POSITIONING ASSISTANCE DATA

METHOD IN SERVER 130 of the set of positioning assistance data, in respect to available resources in the radio network node.

19 Claims, 13 Drawing Sheets

(56) References Cited

FOREIGN PATENT DOCUMENTS

| KR | 1020150128747 A | 11/2015 |
|---|---|---|
| WO | WO 2018/204554 A1 | 11/2018 |

OTHER PUBLICATIONS

International Search Report and Written Opinion of the International Searching Authority, PCT/SE2019/050049, dated Apr. 11, 2019, 16 pages.

Qualcomm Incorporated: "LPPa Procedures for Broadcast of Assistance Data", 3GPP Draft; R3-174450_(LPPA BROADCAST),3GPP TSG-RAN WG3 Meeting #98, Reno, Nevada, USA, Nov. 27-Dec. 1, 2017; Nov. 27, 2017-Dec. 1, 2017, XP051373358, 13 Pages.

CMCC, "The positioning assistance data broadcasting", 3GPP TSG-RAN WG2 Meeting #99bis, Prague, Czech Republic, Oct. 9-13, 2017, R2-1711154, resubmission of R2-1708994, XP51343162, 4 Pages.

Nokia, Nokia Shanghai Bell, "LPPa signaling framework for assistance data broadcast", 3GPP TSG-RAN WG3 Meeting #98, Reno, Nevada, USA, Nov. 27-Dec. 1, 2017, R3-174354, XP51373325, 4 Pages.

Huawei, ZTE Corporation, U-Blox AG, "Signalling procedures for broadcasting of assistance date", 3GPP TSG-RAN3 Meeting #98, Reno, Nevada, USA, Nov. 27-Dec. 1, 2017, R3-174425, XP51373336, 4 Pages.

Notice of Allowance for Korean Patent Application No. 9-5-2022-013703947 dated Feb. 18, 2022, 3 pages.

* cited by examiner

301. BASED ON IMPORTANCE, DETERMINE A PRIORITY ASSOCIATED TO THE RESPECTIVE POSITIONING ASSISTANCE DATA OUT OF THE SET OF POSITIONING ASSISTANCE DATA

302. ASSIST THE RADIO NETWORK NODE BY SENDING THE SET OF POSITIONING ASSISTANCE DATA, AND INFORMATION ABOUT THE DETERMINED PRIORITY ASSOCIATED TO THE RESPECTIVE POSITIONING ASSISTANCE DATA

Figure 3 METHOD IN SERVER 130

401. RECEIVE FROM A SERVER, A SET OF POSITIONING ASSISTANCE DATA, AND INFORMATION ABOUT A PRIORITY ASSOCIATED TO THE RESPECTIVE POSITIONING ASSISTANCE DATA

402. BASED ON THE RECEIVED INFORMATION ABOUT A PRIORITY AND AVAILABLE RESOURCES IN THE RADIO NETWORK NODE, DETERMINE A SCHEDULE FOR BROADCAST OF AT LEAST SOME OF THE RESPECTIVE POSITIONING ASSISTANCE DATA OUT OF THE SET OF POSITIONING ASSISTANCE DATA

Figure 4 METHOD IN RADIO NETWORK NODE 110

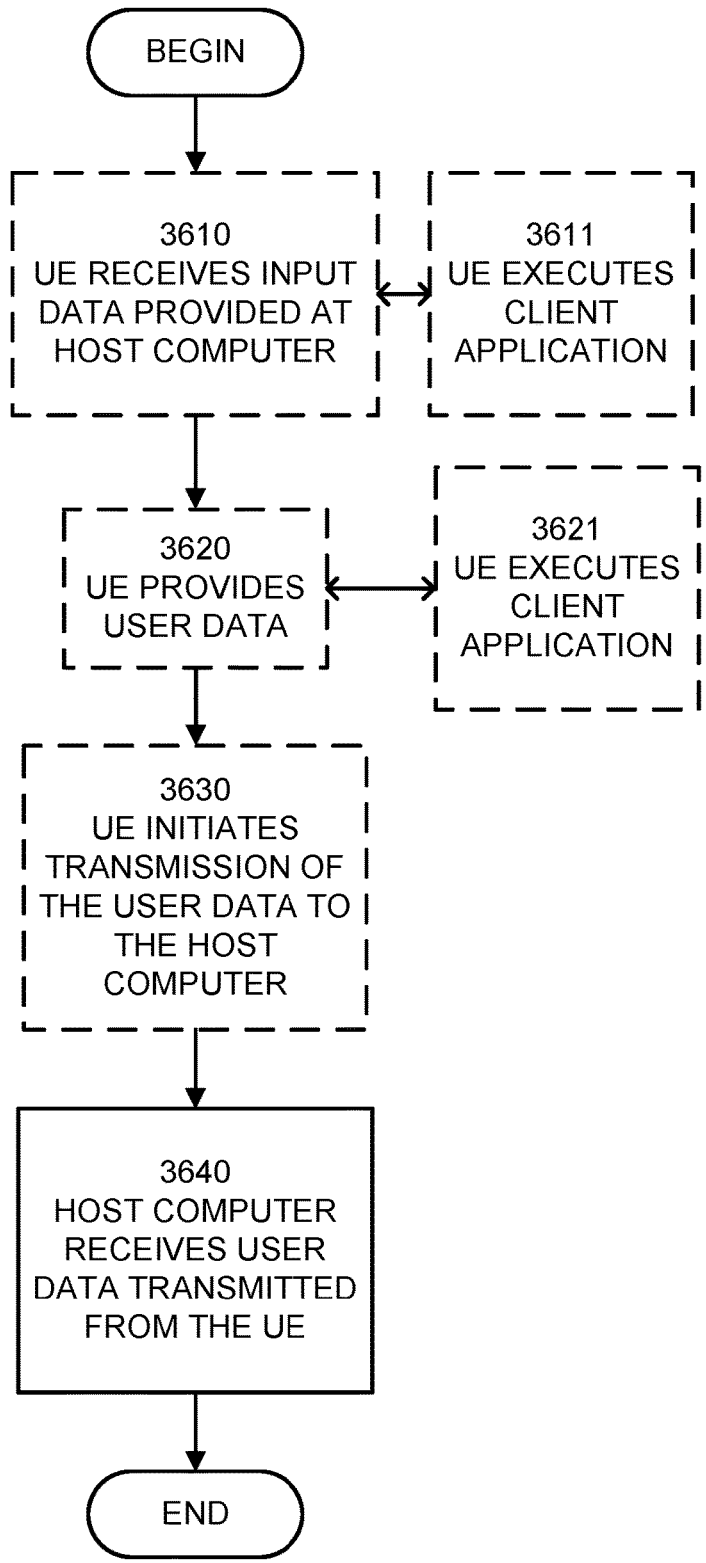
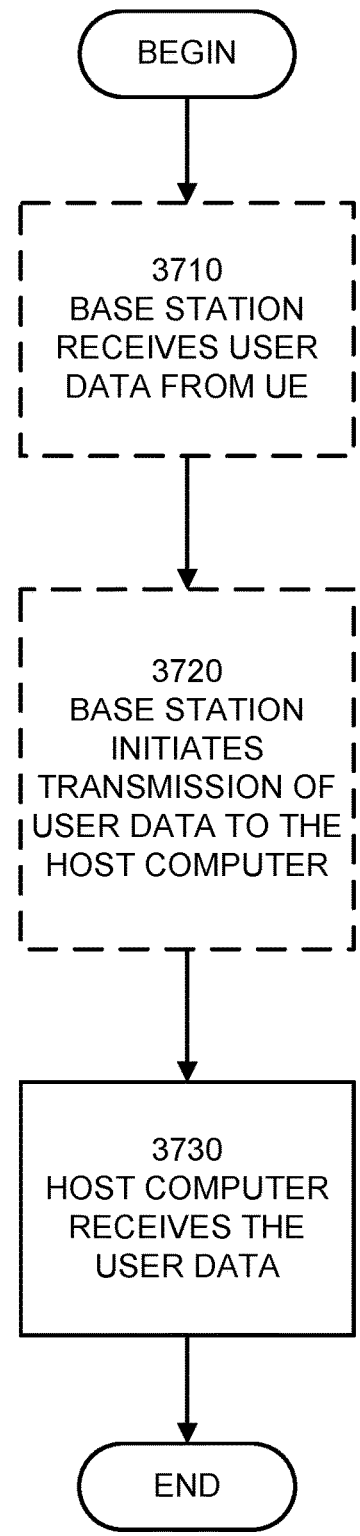
Figure 14
Figure 15

SERVER, RADIO NETWORK NODE AND METHODS IN A WIRELESS COMMUNICATIONS NETWORK

CROSS REFERENCE TO RELATED APPLICATIONS

This application is a 35 U.S.C. § 371 national stage application of PCT International Application No. PCT/SE2019/050049 filed on Jan. 24, 2019, which in turn claims domestic priority to U.S. Provisional Patent Application No. 62/631,544, filed on Feb. 16, 2018, the disclosures and content of which are incorporated by reference herein in their entirety.

TECHNICAL FIELD

Embodiments herein relate to a server, a radio network node and methods therein. In some aspects, they relate to assisting the radio network node to handle a set of positioning assistance data for positioning one or more User Equipments (UEs) in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

UE positioning is recognized as an important feature for LTE networks due to its potential for massive commercial applications (for example intelligent transportation, entertainment, industry automation, robotics, remote operation, healthcare, smart parking and so on) as well as its relevance to US FCC E911 requirements.

Positioning in LTE is supported by the architecture in FIG. 1, with direct interactions between a UE and a location server such as an Evolved Serving Mobile Location Center (E-SMLC) is via the LTE Positioning Protocol (LPP). Moreover, there are also interactions between the location server and the eNodeB via the LPPa protocol, to some extent supported by interactions between the eNodeB and the UE via the Radio Resource Control (RRC) protocol. The architecture of FIG. 1 thus discloses:

The interface LPP TS 36.355 between the E-SMLC and the UE,
the interface LPPa TS 36.455 between the E-SMLC and the eNodeB,
the interface LCS-AP TS 29.171 between the E-SMLC and the Mobility Management Entity (MME),
the interface $SL_9$ TS 29.172 between the MME and the Gateway Mobile Location Center (GMLC),
the interface S1 between the MME and the eNodeB, and
the interface LTE-Uu RRC TS 36.331 between the UE and the eNodeB.

The following positioning techniques are considered in LTE:

Enhanced Cell ID. Essentially cell ID information, together is used to associate a UE to a serving area of a serving cell, and then additional information such as available measurements and procedure information is used to determine a finer granularity position.

Assisted GNSS. GNSS information retrieved by the UE, supported by assistance information is provided to the UE from E-SMLC.

OTDOA (Observed Time Difference of Arrival). The UE estimates the time difference of reference signals from different base stations and sends to the E-SMLC for multilateration.

UTDOA (Uplink TDOA). The UE is requested to transmit a specific waveform that is detected by multiple location measurement units (e.g. an eNB) at known positions. These measurements are forwarded to E-SMLC for multilateration.

Recent enhancements in GNSS technology include Real Time Kinematic (RTK) GNSS, which is a differential GNSS positioning technology which enables positioning accuracy improvement from metre level to decimetre or even centimetre level in the right conditions in real-time by exploiting the carrier phase of the GNSS signal rather than only the code phase. Support for RTK GNSS in LTE networks may therefore be provided and are under standardization in the Release 15 work item. The support for RTK in LTE networks comprises reporting RTK correction data to the UE. Two versions of reporting RTK data to the UE are currently under discussion, the first known method is to broadcast the information by extending the system information bits. The other method is to send the information to each UE individually, for example via LPP. In order to enable user differentiation, it is also relevant to consider encryption of all or parts of the assistance data.

Abstract Syntax Notation One (ASN.1) is a standard interface description language for defining data structures that can be serialized and deserialized in a cross-platform way. It is broadly used in telecommunications, and especially in cryptography. The assistance data shall be encoded as ASN.1, optionally encrypted in the E-SMLC, and sent over LPPa as System Information Blocks (each SIB represented by an octet string). The following information may be associated to each octet string:

Type of assistance data;
Segmentation Information;
GNSS ID, when applicable;
Ciphering key data.

RAN3 already agreed that it shall be possible to signal the different information types independently from one another, and that it may be possible to support different periodicities for the different information types.

RAN3 when used herein means the working group in 3GPP defining the inter-node signaling in the radio access network, which includes the interface LPPa between a base station and the E_SMLC/location server.

SUMMARY

An object of embodiments herein is to improve the performance of a wireless communications network using positioning data.

According to an aspect of embodiments herein, the object is achieved by method performed by a server for assisting a radio network node to handle a set of positioning assistance data for positioning one or more User Equipments, UEs, in a wireless communications network.

Based on importance, the server determines a priority associated to the respective positioning assistance data out of the set of positioning assistance data.

The server assists the radio network node by sending the set of positioning assistance data, and information about the determined priority associated to the respective positioning assistance data. The determined priority enables the radio network node to determine a schedule for broadcast of at least some of the respective positioning assistance data out of the set of positioning assistance data, in respect to available resources in the radio network node.

According to a another aspect of embodiments herein, the object is achieved by a method performed by a radio network node, for handling a set of positioning assistance data for positioning one or more User Equipments, UEs, in a wireless communications network. The radio network node receives from a server, a set of positioning assistance data, and information about a priority associated to the respective positioning assistance data, which priority is related to importance. Based on the received information about a priority and available resources in the radio network node, the radio network node determines a schedule for broadcast of at least some of the respective positioning assistance data out of the set of positioning assistance data.

According to a another aspect of embodiments herein, the object is achieved by a server for assisting a radio network node to handle a set of positioning assistance data for positioning one or more User Equipments, UEs, in a wireless communications network. The server is configured to:

Based on importance determine a priority associated to the respective positioning assistance data out of the set of positioning assistance data, and assist the radio network node by sending the set of positioning assistance data, and information about the determined priority associated to the respective positioning assistance data, which determined priority is adapted to enable the radio network node to determine a schedule for broadcast of at least some of the respective positioning assistance data out of the set of positioning assistance data, in respect to available resources in the radio network node.

According to a another aspect of embodiments herein, the object is achieved by a radio network node for handling a set of positioning assistance data for positioning one or more User Equipments, UEs, in a wireless communications network. The radio network node is configured to:

Receive a set of positioning assistance data, and information about a priority associated to the respective positioning assistance data, which priority is related to importance, and based on the received information about a priority and available resources in the radio network node 110 determine a schedule for broadcast of at least some of the respective positioning assistance data out of the set of positioning assistance data.

BRIEF DESCRIPTION OF THE DRAWINGS

Examples of embodiments herein are described in more detail with reference to attached drawings in which:

FIG. 3 is a flowchart depicting embodiments of a method in a server.
FIG. 4 is a flowchart depicting embodiments of a method in a radio network node.
FIGS. 12-15 are flowcharts illustrating methods implemented in a communication system including a host computer, a base station and a user equipment.

DETAILED DESCRIPTION

As a part of developing embodiments herein a problem will first be identified and discussed.

The amount of positioning data which needs to be broadcasted is quite a lot and there are very different parameters that may be considered at the base station such as the radio network node in order to pack a set of System Information Blocks (SIBs) into one System Information (SI) message. Until now there hasn't been any SIB design RRC as large as the one required for positioning, and therefore there is a need to have a systematic way to assist the SI formation at the base station.

As mentioned above, an object of embodiments herein is to improve the performance of a wireless communications network using positioning data. This may in some embodiments be to ensure that more important positioning assistance data is provided together with available measurements and procedure information the device with higher priority compared to less important positioning assistance data.

Some embodiments provide assistance to the radio network node to form a proper system information in respect to its available radio resource and the priority of the broadcast positioning information.

Example embodiments herein comprises efficient structuring of the broadcasted information to enable the radio network node 110 such as an eNB to determine how to prioritize the large set of data set suggested from the location server to be packed into messages such as SI messages in respect to its available resource.

Embodiments herein may describe a priority framework for SIBs that originates from the location server to enable the eNB to decide how to compile these SIBs into SI messages, and possibly decide which SIBs to not broadcast. The radio network node may be provided by the location server with priority information to enable the eNB to prioritize the positioning information in case there are not enough resources to broadcast all provided information.

Advantages of embodiments herein e.g. comprises:

Embodiments herein enable the radio network node to have a more efficient and wider view on the content of positioning broadcast information which is encoded and encrypted at the location server and not decodable and decrypted at the base station.

Embodiments herein also enable a more optimized usage of the radio resource in the base station, as the radio network node would consider more information for optimizing this procedure.

Figure 2:
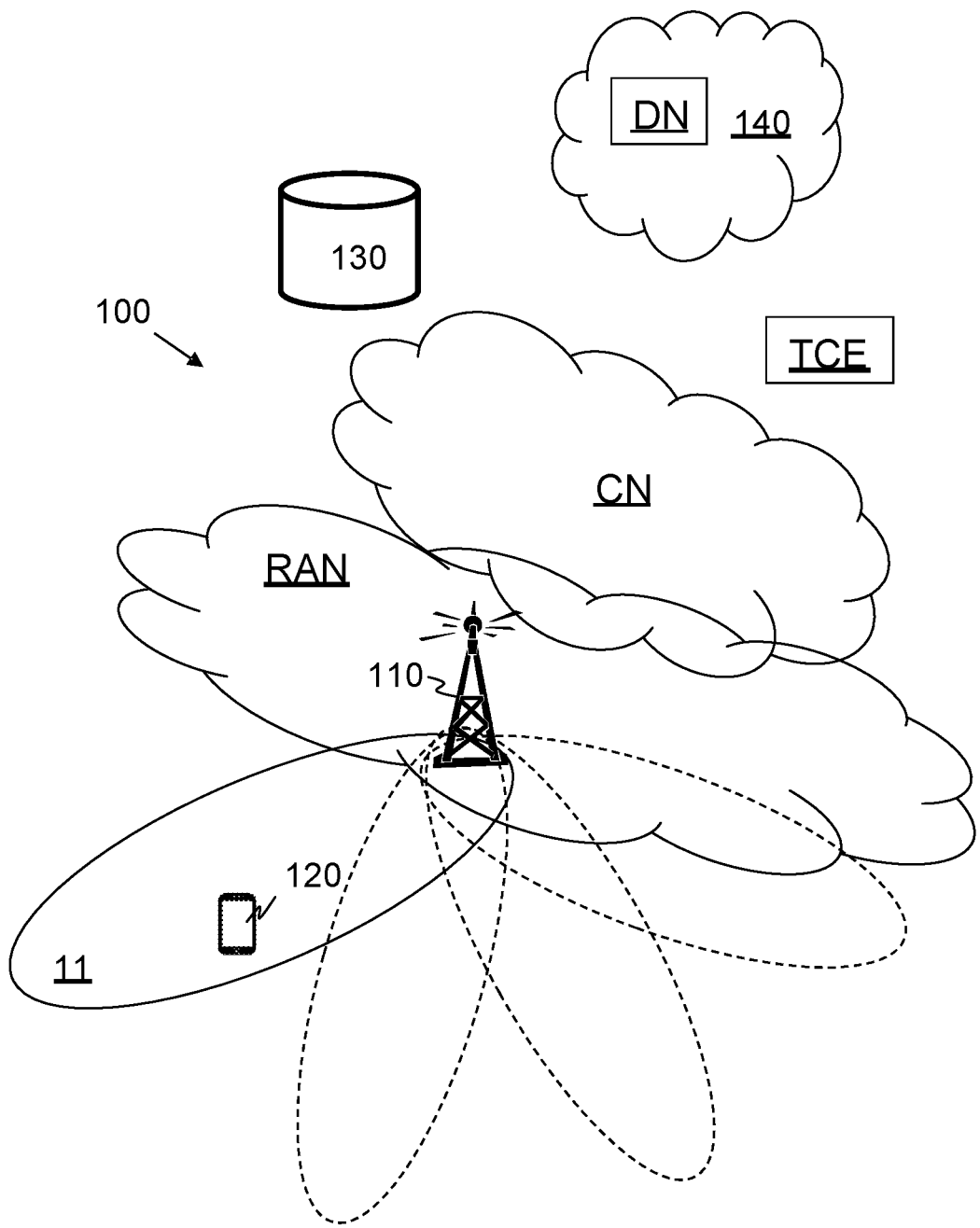
FIG. 2 is a schematic block diagram illustrating embodiments of a wireless communications network.

Embodiments herein relate to wireless communication networks in general. FIG. 2 is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

In the wireless communication network 100, wireless devices e.g. one or more UEs 120 also referred to as device, such as a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

The wireless communications network 100 comprises a radio network node 110 providing radio coverage over a geographical area, a service area 11, which may also be referred to as a beam or a beam group of a first radio access technology (RAT), such as 5G, LTE, Wi-Fi or similar. The radio network node 110 may be a NG-RAN node, transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), agNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 110 may be referred to as a serving radio network node and communicates with the UE 120 with Downlink (DL) transmissions to the UE 120 and Uplink (UL) transmissions from the UE 120.

A server 130, also referred to as a location server 130, operates in the wireless communications network 100.

Figure 1:
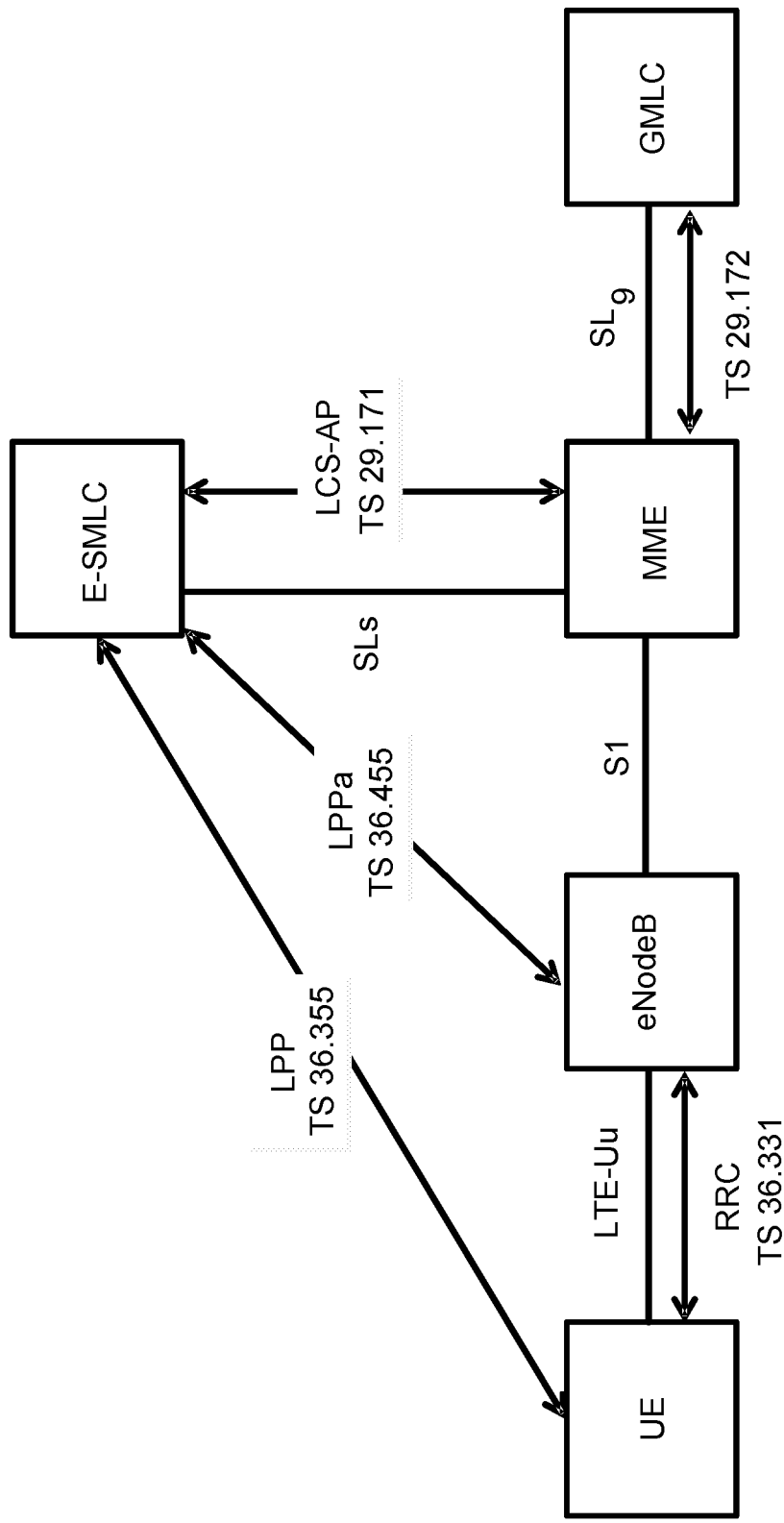
FIG. 1 is a schematic block diagram illustrating prior art.

Methods herein may be performed by the radio network node 110 or the core network node 130. As an alternative, a Distributed Node (DN) and functionality, e.g. comprised in a cloud 140 as shown in FIG. 1, may be used for performing or partly performing the methods. E.g. the location server 130 and the RTK server entities may both be implemented in the cloud 140.

The above described problem is addressed in a number of embodiments, some of which may be seen as alternatives, while some may be used in combination.

FIG. 3 shows example embodiments of a method performed by the server 130 for assisting the radio network node 110 to handle a set of positioning assistance data for positioning one or more UEs 120 in a wireless communications network 100, and will now be described with reference to a flowchart depicted in FIG. 3.

The amount of positioning data in the set of positioning assistance data, which needs to be broadcasted, is quite a lot. Embodiments herein provide a systematic way to assist the radio network node to handle the set of positioning assistance data for positioning one or more UEs 120 in the wireless communications network 100.

The method comprises the following actions, which actions may be taken in any suitable order.

Action 301

To be able to handle the set of positioning assistance data for positioning one or more UEs 120 in the wireless communications network 100, the server 130 may determine a priority for the respective positioning data in the set of positioning assistance data, based on how important they are. Thus, based on importance, the server 130 determines a priority associated to the respective positioning assistance data out of the set of positioning assistance data. A priority associated to the respective positioning assistance data, means a priority that is related to the respective positioning assistance data.

The importance may e.g. comprise any one or more out of: requirements, importance, time criticality, or necessity for prioritized subscription classes.

Subscription classes, when used herein are a means to describe user differentiation where different users have different subscriptions and the different subscriptions are associated to different scope of positioning. A simple set of two subscription classes may be one where no positioning assistance data is included and one where all positioning assistance data is included. Another example is three subscription classes, with one where no positioning assistance data is included, one where some positioning assistance data is included, and one where all positioning assistance data is included. One standardized means for user differentiation and subscription classes is via encryption of the different parts of the broadcasted positioning assistance data, where different ciphering keys can be used for different parts of the positioning assistance data, and different users obtains different ciphering keys for decryption dependent on their subscription class. Prioritized subscription classes when used herein means that some subscription classes are associated to a subset of the positioning assistance data that is considered more important, or vice versa that some subscription classes are considered more important or of higher priority and the subset of the positioning assistance data that these subscription classes have access to is therefore considered more important and of higher priority.

The priority based on importance may concern a piece of positioning assistance data information. This may be order to support prioritization between different pieces if not all pieces can be sent or if some pieces need to be delayed. The full scope of the positioning assistance data may be divided into subsets for efficient coding of the information and to enable flexibility where only the pieces of the positioning assistance data that is needed will be included. A piece of positioning assistance data information when used herein e.g. means a subset, where a subset may correspond to a specific type of positioning information, a specific satellite system, etc. In 3GPP, the different pieces may be tabulated as positioning system information broadcast types.

The priority based on importance may concern how to prioritize the respective positioning assistance data out of the set of positioning assistance data, to be packed into messages in respect to available resources, and to be broadcasted by the radio network node 110. This may e.g. be for helping the radio network node 110 to prioritize between different parts of the set of positioning assistance data in case some of this data will not be sent due to capacity shortage such as lack of available resources, or be sent with a delay. A part of the set of positioning assistance data is also referred to as a system information (SI) message. The part or SI message corresponds to one or more pieces of positioning assistance data, each optionally associated to a priority.

Action 302

The server 130 assists the radio network node 110 by sending the set of positioning assistance data, and information about the determined priority associated to the respective positioning assistance data. The determined priority enables the radio network node 110 to determine a schedule for broadcast of at least some of the respective positioning assistance data out of the set of positioning assistance data, in respect to available resources in the radio network node 110.

The assisting of the radio network node 110 by sending the set of positioning assistance data, and information about the determined priority associated to the respective positioning assistance data, may further comprise sending information about positioning assistance data periodicity. Periodicity may mean how often a part of the positioning system information is broadcasted, typically described as a period time value in sub-seconds, seconds, minutes etc.

FIG. 4 shows example embodiments of a by a radio network node 110, for handling a set of positioning assistance data for positioning one or more User Equipments, UEs, 120 in a wireless communications network 100, and will now be described with reference to the flowchart depicted in FIG. 4.

The method comprises the following actions, which actions may be taken in any suitable order.

Action 401

The radio network node 110 receives from the server 130, a set of positioning assistance data, and information about a priority associated to the respective positioning assistance data, which priority is related to importance.

The importance may comprise any one or more out of: requirements, importance, time criticality, or necessity for prioritized subscription classes.

The priority based on importance may e.g. concern a piece of positioning assistance data information. This may be in order to support prioritization between different pieces if not all can be sent or some need to be delayed The priority based on importance may e.g. concern how to prioritize the respective positioning assistance data out of the set of positioning assistance data, to be packed into messages in respect to available resources, and to be broadcasted by the radio network node 110. This may e.g. be for helping the radio network node 110 to prioritize between different parts of the set of positioning assistance data in case some of this data will not be sent due to capacity shortage such as lack of available resources, or be sent with a delay.

The receiving from the server 130 of the set of positioning assistance data, and information about the determined priority, may further comprise receiving information about positioning assistance data periodicity.

Action 402

Based on the received information about a priority and available resources in the radio network node 110 The radio network node 110 determines a schedule for broadcast of at least some of the respective positioning assistance data out of the set of positioning assistance data. The schedule for broadcast of positioning assistance data when used herein may relate to when in time and where in frequency the different parts of the set of positioning assistance data is transmitted.

The determining of the schedule for broadcast may comprise determining a schedule for broadcast wherein at least some of the respective positioning assistance data out of the set of positioning assistance data are broadcasted in time for the periodicity, and the rest of the set of positioning assistance data is delayed.

This means that not all parts of the set of positioning assistance data is broadcasted according to the specified periodicity. If two or more parts of the set of positioning assistance data is associated to the same priority, then these parts should be treated in the same way in the scheduling.

Figure 5:
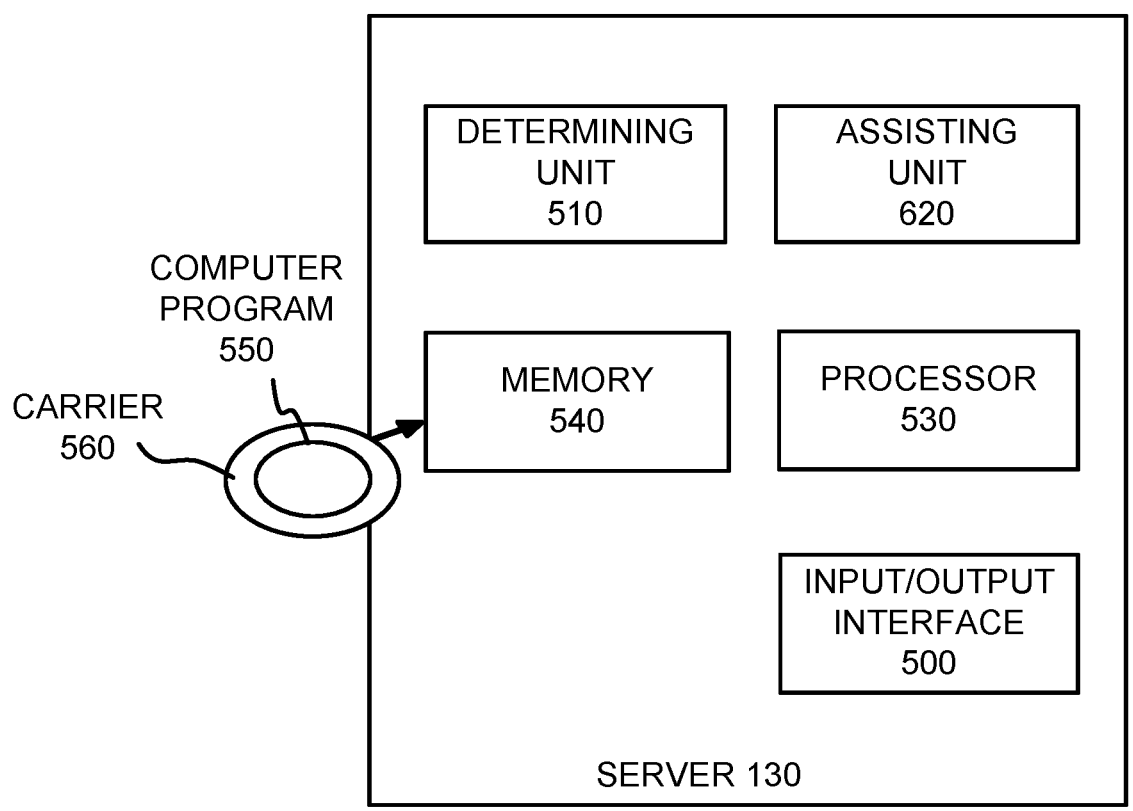

FIG. 5 shows an example of the server 130, which server 130 is for assisting a radio network node 110 to handle a set of positioning assistance data for positioning one or more User Equipments, UEs, 120 in a wireless communications network 100.

To perform the method actions described above, the server 130 may comprise the arrangement depicted in FIG. 5. The Arrangement may comprise a determining unit 510 and an assisting unit 520.

The server 130 is configured to:

Based on importance determine a priority associated to the respective positioning assistance data out of the set of positioning assistance data, and assist the radio network node 110 by sending the set of positioning assistance data, and information about the determined priority associated to the respective positioning assistance data, which determined priority is adapted to enable the radio network node 110 to determine a schedule for broadcast of at least some of the respective positioning assistance data out of the set of positioning assistance data, in respect to available resources in the radio network node 110.

The importance may be adapted to comprise any one or more out of: requirements, importance, time criticality, or necessity for prioritized subscription classes.

The server priority based on importance may be adapted to concern a piece of positioning assistance data information.

The priority based on importance may be adapted to concern how to prioritize the respective positioning assistance data out of the set of positioning assistance data, to be packed into messages in respect to available resources, and to be broadcasted by the radio network node 110.

The server 130 may be configured to assist the radio network node 110, by sending the set of positioning assistance data, and information about the determined priority associated to the respective positioning assistance data, by further sending information about positioning assistance data periodicity.

Figure 6:
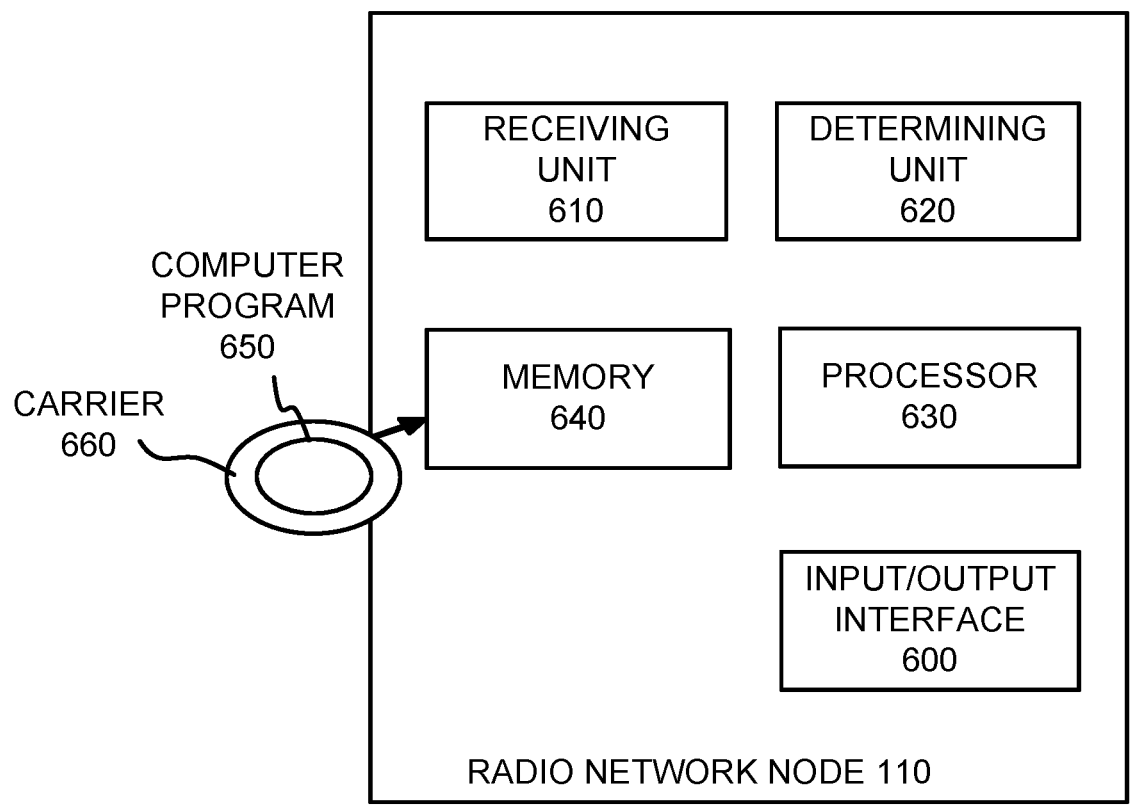
FIG. 6 is a schematic block diagram illustrating embodiments of a radio network node.

FIG. 6 shows an example of the radio network node 110, which network node 110 is for handling a set of positioning assistance data for positioning one or more UEs 120 in a wireless communications network 100.

To perform the method actions described above, the radio network node 110 may comprise the arrangement depicted in FIG. 6. The arrangement may comprise a receiving unit 610 and a determining unit 620.

The radio network node 110 is configured to:

Receive a set of positioning assistance data, and information about a priority associated to the respective positioning assistance data, which priority is related to importance, and based on the received information about a priority and available resources in the radio network node 110 determine a schedule for broadcast of at least some of the respective positioning assistance data out of the set of positioning assistance data.

The importance may be adapted to comprise any one or more out of: Requirements, importance, time criticality, or necessity for prioritized subscription classes.

The priority based on importance may be adapted to concern a piece of positioning assistance data information.

The priority based on importance may be adapted to concern how to prioritize the respective positioning assistance data out of the set of positioning assistance data, to be packed into messages in respect to available resources, and to be broadcasted by the radio network node 110.

The radio network node 110 may further be configured to receive from the server 130, information about positioning assistance data periodicity.

The radio network node 110 may further be configured to determine the schedule for broadcast, wherein at least some of the respective positioning assistance data out of the set of positioning assistance data are broadcasted in time for the periodicity, and the rest of the set of positioning assistance data is delayed.

The radio network node 110 and the server 130 may comprise a respective an input and output interface 500, 600 configured to communicate with each other. The input and output interface may comprise a wireless receiver (not shown) and a wireless transmitter (not shown).

The embodiments herein may be implemented through a respective processor or one or more processors, such as the processor 530, 630 of a processing circuitry in the respective server 130 and radio network node 110 depicted in FIGS. 5 and 6, together with respective computer program code for performing the functions and actions of the embodiments herein. The program code mentioned above may also be provided as a computer program product, for instance in the form of a data carrier carrying computer program code for performing the embodiments herein when being loaded into the respective network node 110 and server 130. One such carrier may be in the form of a CD ROM disc. It is however feasible with other data carriers such as a memory stick. The computer program code may furthermore be provided as pure program code on a server and downloaded to the respective network node 110 and server 130.

The radio network node 110 and the server 130 may further comprise respective a memory 540, 640 comprising one or more memory units. The memory comprises instructions executable by the processor in the radio network node 110 and the server 130.

The respective memory 540, 640 are arranged to be used to store e.g. packet formats, information, data, configurations, and applications to perform the methods herein when being executed in the respective radio network node 110 and the server 130.

In some embodiments, a respective computer program 550, 650 comprises instructions, which when executed by the at least one processor, cause the at least one processor of the respective radio network node 110 and server 130 to perform the actions above.

In some embodiments, a respective carrier 560, 660 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the radio network node 110 and the server 130, described above may refer to a combination of analog and digital circuits, and/or one or more processors configured with software and/or firmware, e.g. stored in the radio network node 110 and the server 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
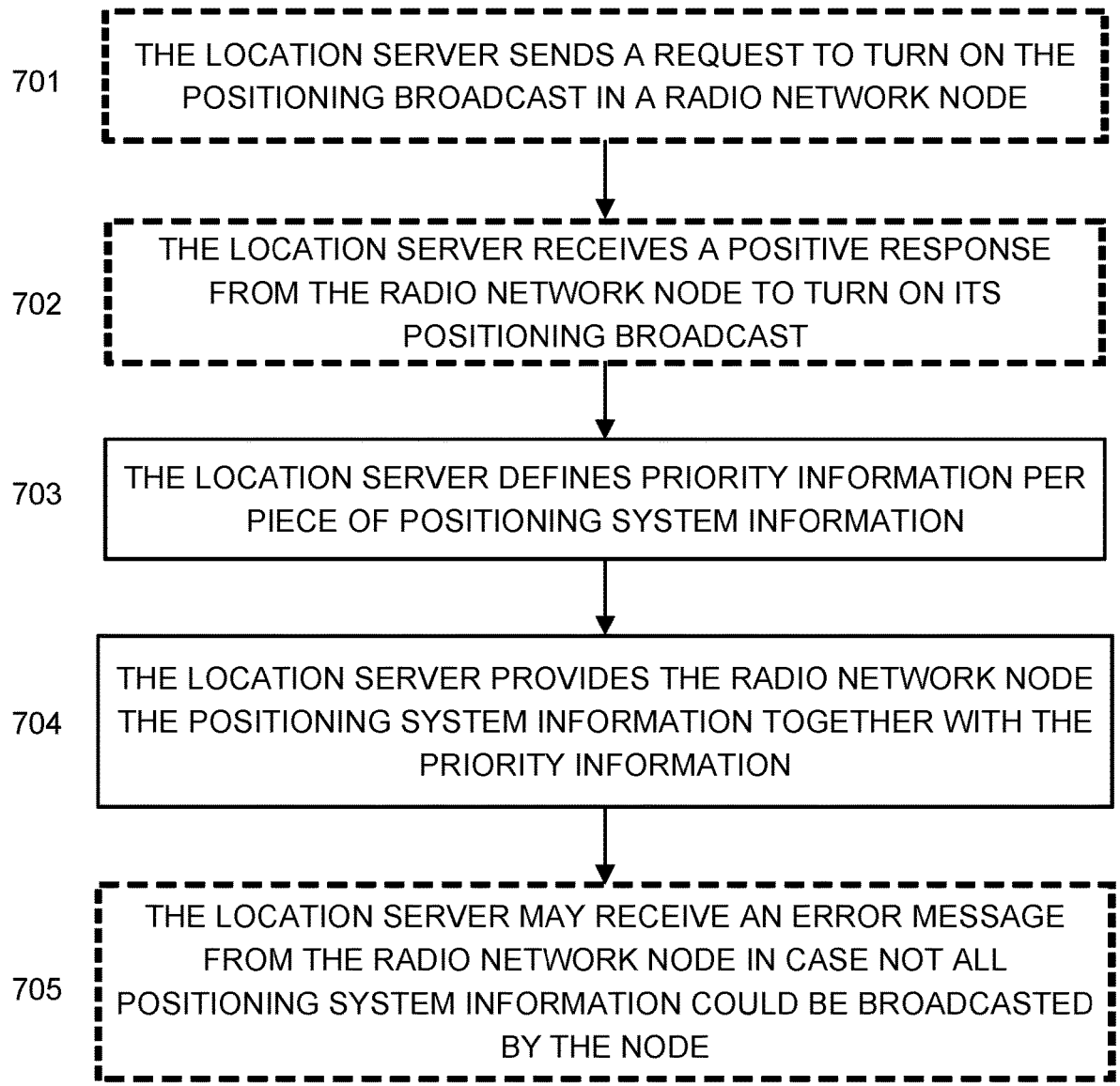
FIG. 7 is a flowchart depicting embodiments of a method in a server.

FIG. 7 shows method actions of an example embodiment herein seen from a location server 130 perspective. In this example the server 130 is represented by a location server, referred to as the location server 130.

In actions 701-702, the location server 130 may optionally handshake the activation of the positioning system information broadcast.

The location server 130 sends 701 a request to turn on the positioning broadcast in the radio network node 110. The location server 130 receives 702 a positive response from the radio network node 110 to turn on its positioning broadcast.

Then, the location server 130 defines 703 priority information per piece of positioning system information, and provides 704 the priority information together with the positioning system information to the radio network node 110. In case the radio network node 110 fails to broadcast all provided positioning system information, it will notify the location server 130 (705), typically via an error message, but other messages are not precluded. Thus, the location server 130 may receive 705 an error message from the radio network node 110 in case not all positioning system information may be broadcasted by the node.

Figure 8:
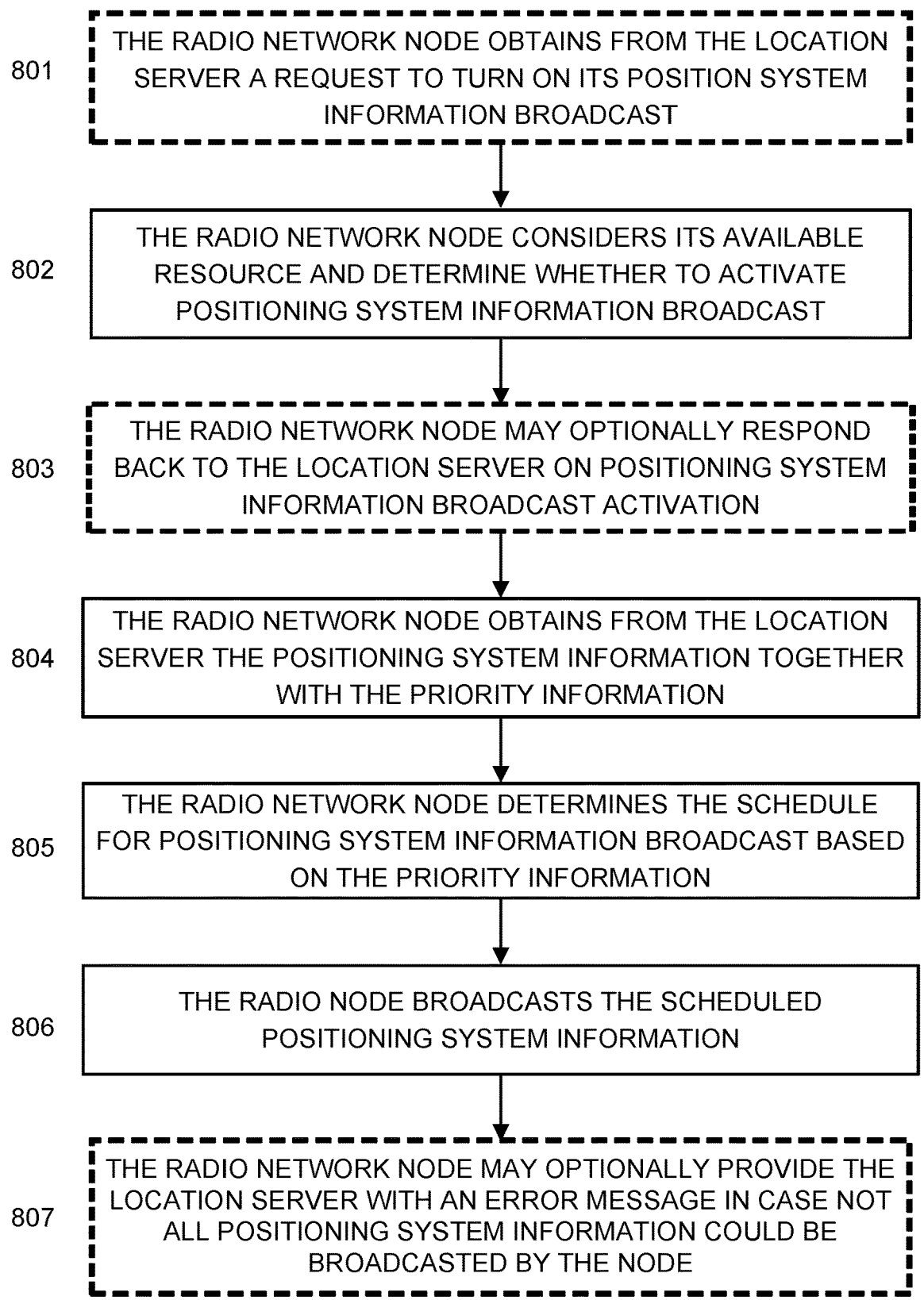
FIG. 8 is a flowchart depicting embodiments of a method in a radio network node.

FIG. 8 shows method actions of an example embodiment herein seen from the a radio network node 110 perspective.

In this example the server 130 is represented by a location server, referred to as the location server 130.

In actions, also referred to as steps, 801-802, the radio network node 110 and the server 130 also referred to as the location server 130 may optionally handshake the activation of the positioning system information broadcast, where the radio network node 110 considers its available resources and base the decision on the resource situation but also optionally on other factors (802). The radio network node 110 obtains 801 from the location server 130 a request to turn on its position system information broadcast. The radio network node 110 considers 802 its available resource and determine whether to activate positioning system information broadcast.

The radio network node 110 may optionally response 803 back to the location server 130 on positioning system information broadcast activation. The radio network node 110 obtains 804 priority information together with the positioning system information from the location server 130. Based on the priority information, the radio network node 110 determines 805 the schedule for the positioning system information, and broadcasts 806 the scheduled positioning system information. In case the radio network node 110 fails to broadcast all provided positioning system information, or In case not all positioning system information may be broadcasted, the radio network node 110 may notify the location server 130 (807), typically via an error message, but other messages are not precluded. Thus the radio network node 110 may optionally provide 807 the location server with an error message in case not all positioning system information may be broadcasted by the node.

It may be up to the base station such as the radio network node 110, to decide in what to include in SI messages based on its available resources. However, in case of positioning, this is not a trivial task as there are many encrypted octet strings which are being suggested to the radio network node for broadcast, and while the radio network node 110 does not know the content and specifications of the message, it is very helpful and efficient to provide the radio network node this information in a compact way.

The prioritization of the positioning information suggested by the location server may be done in different ways. In some embodiments, this may be provided implicitly by the Priority Catalog Positioning Information. In another embodiment, it may be by implementation, e.g. highest positioning assistance info item ID is interpreted as having the highest priority etc.

Positioning Assistance Data

The scope of the positioning assistance data may be comprehensive, and may be structured in different ways. It may be structured according to the assistance data scope, the satellite system, the assistance data protocol version, the encryption details, the manufacturer aspects etc. These are not mutually exclusive scope separations, and they will be described in more detail below.

Assistance Data Scope

One way to separate is according to the overall scope, such as e.g.

1. Cellular network assistance data
2. GNSS assistance data for code phase measurements
3. GNSS assistance data for carrier phase measurements Cellular network assistance data may comprise information about what signals the target device e.g. a UE, shall search for and when/where to receive them, what signals the device shall transmit and when/where to transmit them, or a combination. This information comprises the positioning reference signals sent in the downlink and signals sent in the uplink to support positioning. In one mode, these signals are part of OTDOA (downlink) positioning based on device measurements of the receives signal time difference (RSTD), This information is typically the same in a region and is therefore reasonable to broadcast.

Another example of cellular network assistance data is to also include information about the positions and the time synchronization details of the base stations such as the radio network node 110. This may enable the device to position itself—a UE-based positioning method.

GNSS assistance data for code phase measurements may concern differential methods to compensate for atmospheric disturbances, sometimes commonly referred to as differential GNSS. The information also may include satellite position information commonly referred to as assisted GNSS. Some of the corrections may also sent from the satellites themselves, referred to as a Satellite Based Augmentation System (SBAS).

Capable devices may also estimate the carrier phase of the received signals from the satellites. Such measurements provide a very accurate range estimate except for an unknown integer number of cycles. Based on assistance data, this integer ambiguity may be resolved using Real Time Kinematics (RTK) techniques. The assistance data is based on accurate measurements from one or more accurately positioned reference stations. Either, one reference station, like the closest, may be used, or multiple stations in a network, Network RTK. In case of multiple reference stations, the system may consider using the one closest to the device or interpolate between multiple reference stations to get assistance data that is better adapted to the position of the device. Either, the interpolation is performed by the RTK server, and one or more virtual reference stations are sent to the device, or information about all relevant reference stations are sent to the device together with some interpolation information. Two typical methods for device interpolation are discussed, FKP and MAC.

Furthermore, even more accurate satellite positions may be part of the assistance data in the form of Precise Point Positioning (PPP). Furthermore, recently, a more compact representation of assistance data have been discussed, state space representation (SSR).

Assistance Data Per Satellite System

The assistance data may be separated based of the concerned satellite system, such as GPS, GLONASS, Gallileo, BeiDou, QZSS etc.

Assistance Data Protocol Version

The assistance data may be encoded in a coding scheme. The cellular network and code phase assistance data is already today encoded in ASN.1 in LTE for unicast from the location server to the device via the LTE positioning Protocol (LPP). The assistance data has changed between releases and gradually more information has been added. Therefore, assistance data represented in ASN.1 also need a protocol or release version. ASN.1 is typically backwards compatible via an extension framework, so a device supporting e.g. Rel. 13 may retrieve the Rel 13 relevant parts from a Rel. 14 assistance data block.

For Radio Technical Commission for Maritime Services (RTCM), the code phase assistance data are represented by versions 2.x and the carrier phase assistance data are represented by versions 3.x.

Assistance Data Encryption

Assistance data may be encrypted to protect the information and to enable user differentiation. In some embodiments, one subscriber group gets access to the broadcasted data and one also to the unicast data. In such a case, only one encryption group key is enough. However, it is also good to be prepared for a more segmented assistance data, supporting multiple encryption keys for separate encryption of different parts of the broadcast data.

In some embodiments, the decryption key is associated to a decryption key index, and the device may retrieve a decryption key and the associated index from the location server. In one mode, the description of the key is more descriptive than only an index.

In some other embodiments, the decryption keys are hierarchical, meaning that a key that may decrypt assistance data of index i may also decrypt assistance data of a lower (or higher) index.

Manufacturer and Assistance Data

In RTCM, a tradition is to support manufacturer specific information. Therefore, the assistance data may also be segmented based on manufacturer.

PRIORITY INFORMATION

Priority Attribute

In some embodiments, the priority information is associated to each system information block as part of the meta data sent with each SIB. It may be represented as an attribute encoded as an INTEGER or an ENUMERATE or similar to allow a representation of priority to stress the relative priority between different SIBs.

In an exemplifying signaling example, the priority may be introduced in LPPa as:

9.2.x Assistance Information

This parameter contains the assistance information.

information segment encoded and encrypted by the location server. This information may be transmitted via LPPa protocol and it would be optionally used by the radio network node for SI message formation.

In some embodiments, there may be certain rules in how the prioritization may be linked into the presentation order in the Priority Catalog Positioning Information, based on the importance of each parameter. The list may be sorted with an index numbering in which the optional feedback from the radio network node 110 about which positioning data was chosen may be signaled back to the location server with a list of index number representing each chosen positioning information segment. The location server 130 may refine its future Priority Catalog Positioning Information for one certain radio network node based on the aggregated feedback over time.

Positioning Information Segment Parameters

The Positioning Information Segment Parameters may comprise any one or more out of:

Information Type

Periodicity

Size of the information

Encryption index key

GNSS ID

Priority

In some embodiments, the Positioning System Information message may be mainly packed with respect to the periodicity of each data type. In some other embodiments, the size of each information data may be an important parameter in SI message formation. Meaning that the large TABLE 9.2.x-1

| Assistance Information | | | | |
|---|---|---|---|---|
| IE/Group Name | Presence | Range | IE type and reference | Semantics description |
| Assistance Information | | 1. <maxnoAssistInfo | | |
| Assistance Information Item ID | M | | INTEGER (1.32, . . .) | |
| System Information Block | M | | OCTET STRING (SIZE(xx)) | |
| egmentation Information | M | | OCTET STRING (SIZE(xx)) | |
| GNSS ID | O | | INTEGER (1.xx, . . .) | |
| Ciphering Information | O | | OCTET STRING (SIZE(xx)) | |
| Broadcast Periodicity | O | | 9.2.y | |
| Priority | O | | INTEGER (1.xx, . . .) | |

| Range bound | Explanation |
|---|---|
| maxnoAssistInfo | Maximum no. of assistance information items that may be signaled with one message. Value is 32. |

Priority Catalog Positioning Information

Figure 9:
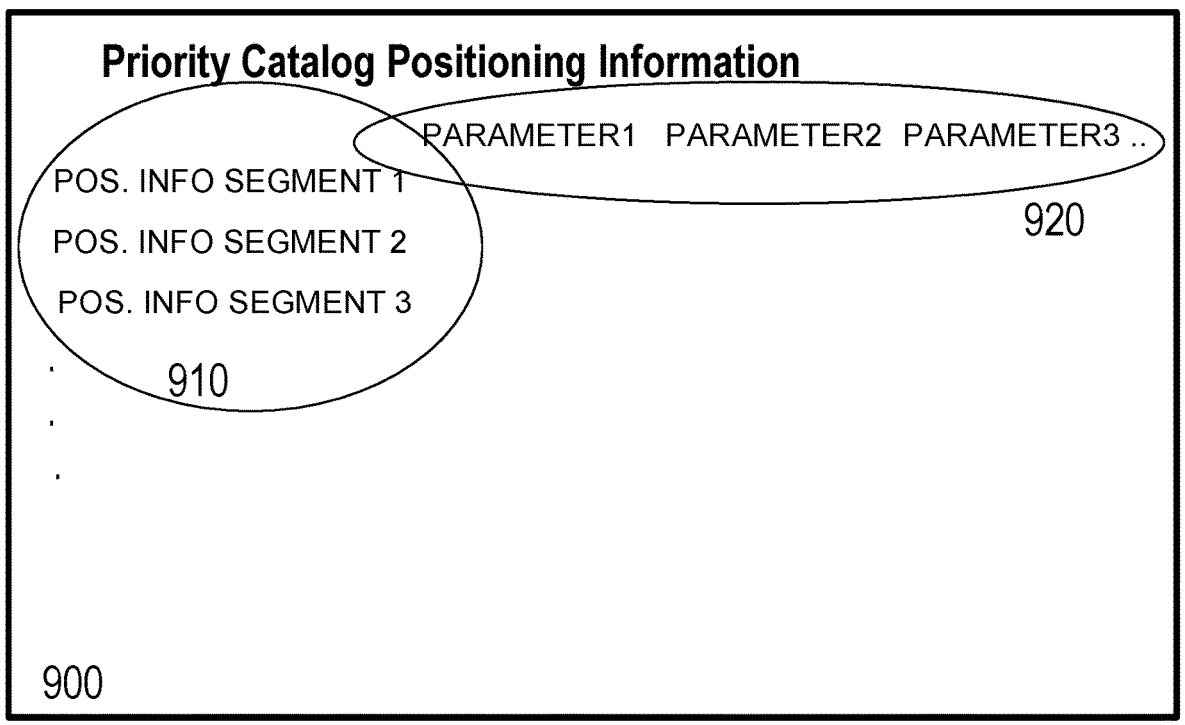
FIG. 9 is a schematic block diagram illustrating an embodiments herein.

FIG. 9 depicts an example of a Priority Catalog Positioning Information.

In some other embodiments, priority information may instead represented by a Priority Information Catalog Positioning Information element 900 that lists the positioning information segments 910, where each entry comprises one or more of Positioning Information Segment Parameters 920 as it is shown in FIG. 9.

Embodiments herein may concern efficient structuring of the broadcasted information to enable the radio network node 110 such as an eNB to determine how to prioritize the large set of data set suggested from the location server to be packed into SI messages in respect to its available resource.

The Priority Catalog Positioning Information is a compact way of presenting the radio network node with the content, the size, the key tag and the periodicity of each positioning size data may be postponed or rejected by the radio network node 110 in case of limited available resource. In another embodiment, the encryption index key may become an important factor. For example, a key for highly prioritized subscription level UEs, may put some certain positioning information segments in priority compared to the rest of the data.

Some example embodiments are described below:

The assistance data may be encoded as ASN.1, optionally encrypted in the E-SMLC, and sent over LPPa as System Information Blocks (each SIB represented by an octet string). The following information may be associated to each octet string:

Type of assistance data;

Segmentation Information;

GNSS ID, when applicable;

Ciphering key data.

It may be possible to signal the different information types independently from one another, and it may be possible to support different periodicities for the different information types.

IE Structure, Periodicity

The IE structure may be extensible, enabling different parts of the assistance information to be signaled by the E-SMLC independently and with different periodicities.

Currently the following assistance information types are being discussed in RAN2:

GNSS common assistance data (e.g. GNSS reference time and location, ionospheric model, Earth orientation parameters, RTK common assistance data);

GNSS generic assistance data (e.g. time model list, differential corrections, navigation model, real time integrity, data bit assistance, acquisition assistance, almanac, UTC model, auxiliary information, BDS differential corrections and grid model parameters, RTK generic assistance data);

OTDOA assistance data (for both UE-assisted and UE-based OTDOA).

It may be beneficial to define separate groups of optional IEs (OCTET STRINGs, containing the SIBs) for the different assistance information types, and to also signal different broadcast periodicities (optional IEs) for the different types of assistance information.

According to some embodiments herein: Separate groups of IEs (OCTET STRINGs) may be defined for the different information types.

According to some embodiments herein: Signal the different periodicities (as optional IEs) for the different information types.

Since RAN3 has agreed that the eNB should have the last decision on resource allocation for broadcasting, the eNB may take the signaled periodicity into account.

According to some embodiments herein: The eNB may take the signaled periodicity into account.

Encryption

Assistance information may be encrypted end-to-end, although the actual mechanism is pending confirmation by RAN2, SA2, SA3; nevertheless, ciphering information is to be signaled from the E-SMLC to the eNB over LPPa.

It should be noted that this ciphering information may not include the encryption key(s), the keys may be signaled from the EPC to the UE(s) via NAS messages. In each broadcasted SIB, there may be an identifier for each key used by E-SMLC to encrypt the individual octet string; the UE may look into this identifier to check whether it matches the encryption key it received. If it does not match, the UE may avoid attempting decryption, saving some processing and energy.

It may be beneficial to signal the appropriate Ciphering Information IE(s) as optional, to be able to support the potential use case of unencrypted broadcast of assistance data (if desired).

According to some embodiments herein: If it is desired to be able to support unencrypted broadcast of assistance data, IE(s) containing ciphering information may be optional.

Broadcast Priority

As previously noted, the eNB, such as the radio network node 110, may have the last decision on resource allocation for broadcasting. It descends from this that it should be allowed to avoid broadcasting for one or more SIB(s) due to e.g. radio resource shortage. It may be beneficial for the E-SMLC to signal a broadcast priority level for each SIB element in the ASSISTANCE INFORMATION message, so that the eNB may use this information in case it decides to drop one or more SIB(s).

The SIB priority level may be implicit (linked to e.g. a SIB identifier signaled by the E-SMLC) or explicit (e.g. an additional per-SIB IE included in the ASSISTANCE INFORMATION message).

The baseline CR may need to be updated pending progress in other WGs.

Embodiments herein may comprise:

Separate groups of IEs (OCTET STRINGs) should be defined for the different information types.

Signal the different periodicities (as optional IEs) for the different information types.

The eNB may take the signaled periodicity into account.

If it is desired to be able to support unencrypted broadcast of assistance data, IE(s) containing ciphering information should be optional.

Further discuss the potential use case and benefits of signaling SIB priority level(s) from the E-SMLC to the eNB.

Below, some example embodiments 1-14 are described.

Embodiment 1. A method performed by a server 130, such as e.g. a location server, e.g. for assisting a radio network node 110 to handle a set of positioning assistance data for positioning one or more User Equipments, UEs, 120 in a wireless communications network 100, the method comprising:

based on importance such as e.g. requirements, importance, time criticality, necessity for prioritized subscription classes, determining 301 a priority associated to the respective positioning assistance data out of the set of positioning assistance data, assisting 302 the radio network node 110 by sending the set of positioning assistance data, and information about the determined priority associated to the respective positioning assistance data, which determined priority enables the radio network node 110 to determine a schedule for broadcast of at least some of the respective positioning assistance data out of the set of positioning assistance data, in respect to available resources in the radio network node 110.

The priority based on importance may concern the piece of positioning assistance data information, e.g. in order to support prioritization between different pieces if not all may be sent or some need to be delayed.

E.g., how to prioritize the respective positioning assistance data out of the set of positioning assistance data, to be packed into messages in respect to available resources, and to be broadcasted by the radio network node 110. E.g. for helping the radio network node prioritize between different parts of the set of positioning assistance data in case some of this data will not be sent due to capacity shortage such as lack of available resources, or be sent with a delay.

Embodiment 2. The method according to Embodiment 1, wherein assisting, 302 the radio network node 110 by sending the set of positioning assistance data, and information about the determined priority associated to the respective positioning assistance data, further comprises sending information about positioning assistance data periodicity.

Embodiment 3. A computer program comprising instructions, which when executed by a processor, causes the processor to perform actions according to any of the Embodiments 1-2.

Embodiment 4. A carrier comprising the computer program of Embodiment 3, wherein the carrier is one of an electronic signal, an optical signal, an electromagnetic signal, a magnetic signal, an electric signal, a radio signal, a microwave signal, or a computer-readable storage medium.

Embodiment 5. A method performed by a radio network node 110, e.g. for handling a set of positioning assistance data for positioning one or more User Equipments, UEs, 120 in a wireless communications network 100, the method comprising:

receiving 401 from a server 130 such as e.g. a location server, a set of positioning assistance data, and information about a priority associated to the respective positioning assistance data, which priority is related to importance, such as e.g. requirements, importance, time criticality, necessity for prioritized subscription classes, based on the received information about a priority and available resources in the radio network node 110 determining 402 a schedule for broadcast of at least some of the respective positioning assistance data out of the set of positioning assistance data.

This may mean that the radio network node 110 is helped as how to prioritize the respective positioning assistance data out of the set of positioning assistance data, to be packed into messages in respect to available resources, and to be broadcasted. E.g. the radio network node 110 is helped to prioritize between different parts of the set of positioning assistance data in case some of this data will not be sent due to capacity shortage such as lack of available resources, or be sent with a delay.

Embodiment 6. The method according to Embodiment 5, wherein receiving, 401 from the server 130 the set of positioning assistance data, and information about the determined priority, further comprises receiving information about positioning assistance data periodicity.

Embodiment 7. The method according to any of the Embodiments 5-6, wherein determining 402 a schedule for broadcast comprises determining a schedule for broadcast wherein at least some of the respective positioning assistance data out of the set of positioning assistance data are broadcasted in time for the periodicity, and the rest of the set of positioning assistance data is delayed.

Embodiment 8. A computer program comprising instructions, which when executed by a processor, causes the processor to perform actions according to any of the Embodiments 5-7.

Embodiment 9. A carrier comprising the computer program of Embodiment 8, wherein the carrier is one of an electronic signal, an optical signal, an electromagnetic signal, a magnetic signal, an electric signal, a radio signal, a microwave signal, or a computer-readable storage medium.

Embodiment 10. A server 130, such as e.g. a location server, e.g. for assisting a radio network node 110 to handle a set of positioning assistance data for positioning one or more User Equipments, UEs, 120 in a wireless communications network 100, the server 130 being configured to:

based on importance such as e.g. requirements, importance, time criticality, necessity for prioritized subscription classes, determine e.g. by means of determining unit 510, a priority associated to the respective positioning assistance data out of the set of positioning assistance data, assist e.g. by means of an assisting unit 520, the radio network node 110 by sending the set of positioning assistance data, and information about the determined priority associated to the respective positioning assistance data, which determined priority is adapted to enable the radio network node 110 to determine a schedule for broadcast of at least some of the respective positioning assistance data out of the set of positioning assistance data, in respect to available resources in the radio network node 110.

Embodiment 11. The method according to Embodiment 10, wherein the server 130 is configured to assist the radio network node 110, e.g. by means of the assisting unit, by sending the set of positioning assistance data, and information about the determined priority associated to the respective positioning assistance data, by further sending information about positioning assistance data periodicity.

Embodiment 12. A radio network node 110, e.g. for handling a set of positioning assistance data for positioning one or more User Equipments, UEs, 120 in a wireless communications network 100, the radio network node 110 being configured to:

receive, e.g. by means of a receiving unit 610, from a server 130 such as e.g. a location server, a set of positioning assistance data, and information about a priority associated to the respective positioning assistance data, which priority is related to importance, such as e.g. requirements, importance, time criticality, necessity for prioritized subscription classes, and based on the received information about a priority and available resources in the radio network node 110 e.g. by means of a determining unit 620, determine a schedule for broadcast of at least some of the respective positioning assistance data out of the set of positioning assistance data.

Embodiment 13. The method according to Embodiment 12, wherein the radio network node 110 further is configured to receive, e.g. by means of a receiving unit, from the server 130 information about positioning assistance data periodicity.

Embodiment 14. The method according to any of the Embodiments 12-13, wherein the radio network node 110 further is configured to determine, e.g. by means of a determining unit, the schedule for broadcast wherein at least some of the respective positioning assistance data out of the set of positioning assistance data are broadcasted in time for the periodicity, and the rest of the set of positioning assistance data is delayed.

Figure 10:
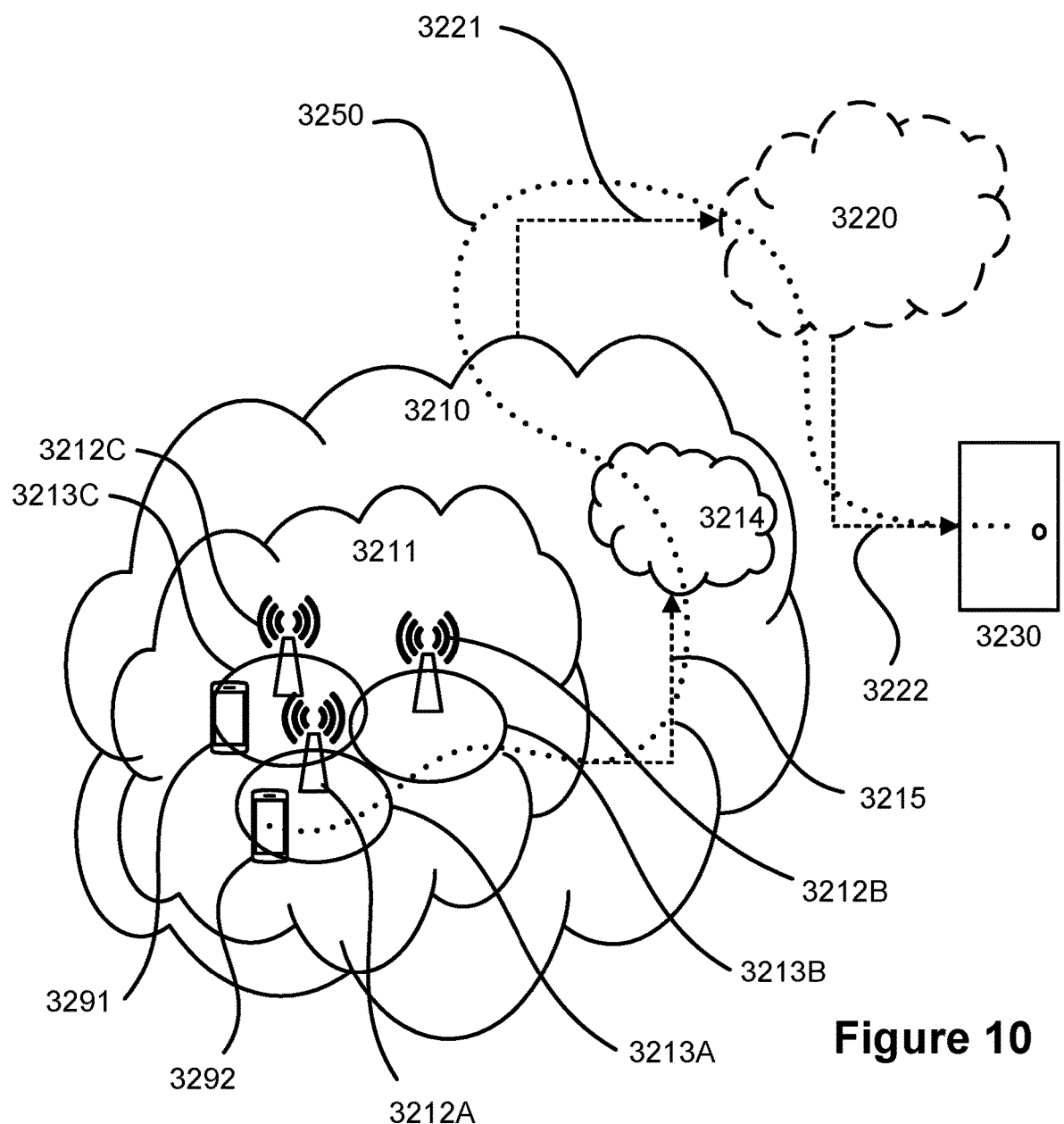
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

Figure 11:
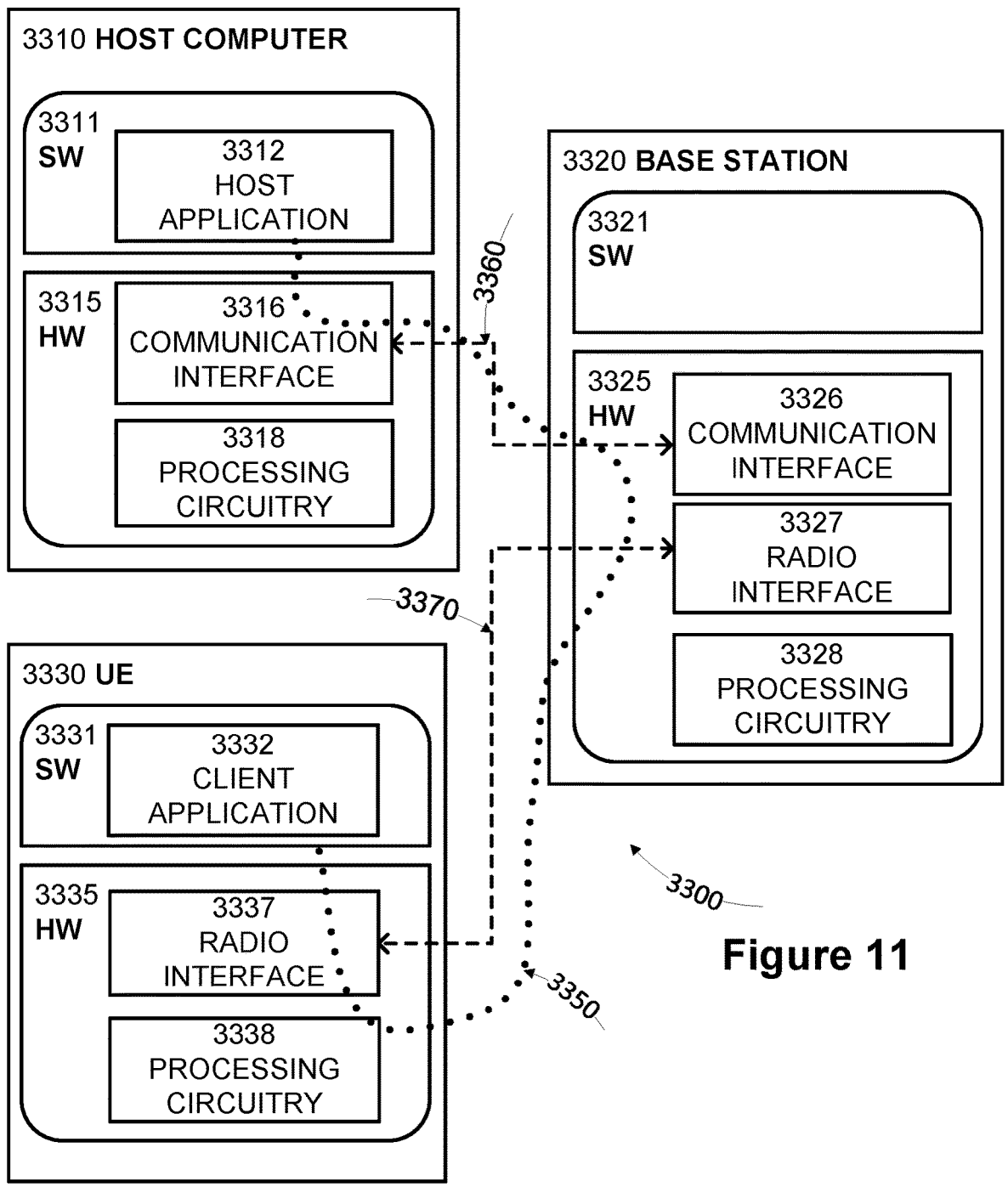
FIG. 11 is a generalized block diagram of a host computer communicating via a base station with a user equipment over a partially wireless connection.

In FIG. 11, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
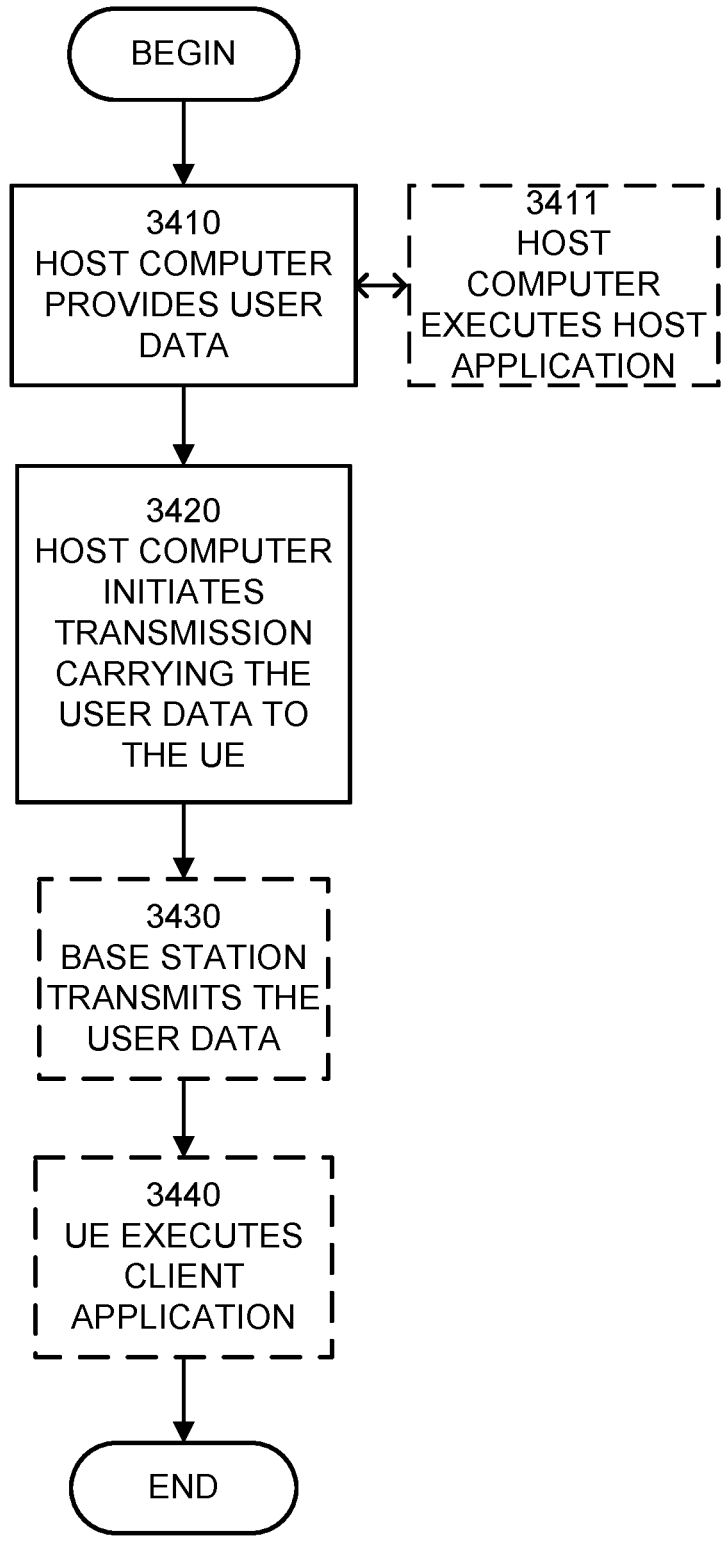

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
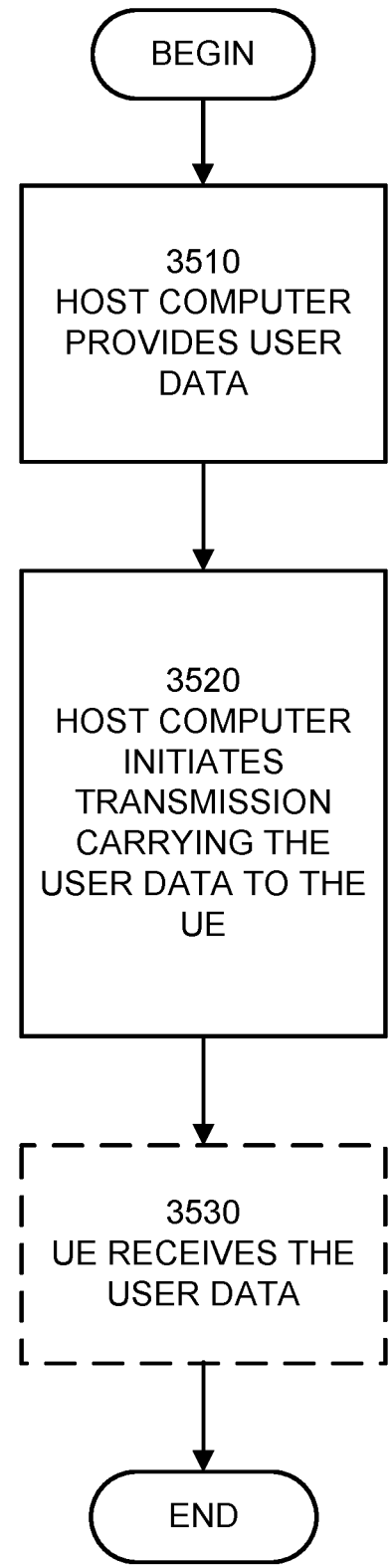

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 14 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station such as a AP STA, and a UE such as a Non-AP STA which may be those described with reference to FIG. 10 and FIG. 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| ABBREVIATIONS | |
|---|---|
| Abbreviation | Explanation |
| A-GNSS | Assisted- GNSS |
| DGNSS | Differential GNSS |
| FKP | Flächen Korrektur Parameter |
| GNSS | Global Navigation Satellite System |
| MAC | Master Auxiliary Concept |
| OTDOA | Observed Time Difference of Arrival |
| RTK | Real Time Kinematics |
| PPP | Precise Point Positioning |
| SBAS | Satellite Based Augmentation System |
| SSR | State Space Representation |
| VRS | Virtual Reference Station |

The invention claimed is:

1. A method performed by a server for assisting a radio network node to handle a set of positioning assistance data for positioning one or more User Equipments, UEs, in a wireless communications network, the method comprising:
sending the radio network node a request to activate a position system information broadcast;
based on importance, determining an explicit priority associated to respective positioning assistance data out of the set of positioning assistance data, wherein the explicit priority is determined for a positioning assistance data in the set of positioning assistance data irrespective of the importance of other positioning assistance data in the set of positioning assistance data, and assisting the radio network node by sending the set of positioning assistance data, and information about the determined explicit priority associated to the respective positioning assistance data, which determined explicit priority enables the radio network node to determine a schedule for broadcast of at least some of the respective positioning assistance data out of the set of positioning assistance data, in respect to available resources in the radio network node.

2. The method according to claim 1, wherein the importance comprises any one or more out of: requirements, importance, time criticality, or necessity for prioritized subscription classes.

3. The method according to claim 1, wherein the priority based on importance concerns a piece of positioning assistance data information.

4. The method according to claim 1, wherein the priority based on importance concerns how to prioritize the respective positioning assistance data out of the set of positioning assistance data, to be packed into messages in respect to available resources, and to be broadcasted by the radio network node.

5. The method according to claim 1, wherein assisting, the radio network node by sending the set of positioning assistance data, and information about the determined priority associated to the respective positioning assistance data, further comprises sending information about positioning assistance data periodicity.

6. A method performed by a radio network node, for handling a set of positioning assistance data for positioning one or more User Equipments, UEs, in a wireless communications network, the method comprising:

receiving a request from a server to activate a position system information broadcast;

receiving, from the server a set of positioning assistance data, and information about an explicit priority associated to the respective positioning assistance data, which explicit priority is related to importance, wherein the explicit priority is determined for a positioning assistance data in the set of positioning assistance data irrespective of the importance of other positioning assistance data in the set of positioning assistance data, and based on the received information about the explicit priority and available resources in the radio network node determining a schedule for broadcast of at least some of the respective positioning assistance data out of the set of positioning assistance data.

7. The method according to claim 6, wherein the importance comprises any one or more out of: requirements, importance, time criticality, or necessity for prioritized subscription classes.

8. The method according to claim 6, wherein the explicit priority based on importance concerns a piece of positioning assistance data information.

9. The method according to claim 6, wherein the explicit priority based on importance concerns how to prioritize the respective positioning assistance data out of the set of positioning assistance data, to be packed into messages in respect to available resources, and to be broadcasted by the radio network node.

10. The method according to claim 6, wherein receiving, from the server the set of positioning assistance data, and information about the determined explicit priority, further comprises receiving information about positioning assistance data periodicity.

11. A method performed by a radio network node, for handling a set of positioning assistance data for positioning one or more User Equipments, UEs, in a wireless communications network, the method comprising:

receiving a request from a server to activate a position system information broadcast;

receiving, from the server a set of positioning assistance data, information about an explicit priority associated to the respective positioning assistance data, which explicit priority is related to importance, and information about positioning assistance data periodicity, and based on the received information about the explicit priority and available resources in the radio network node determining a schedule for broadcast of at least some of the respective positioning assistance data out of the set of positioning assistance data, wherein determining a schedule for broadcast comprises determining a schedule for broadcast wherein at least some of the respective positioning assistance data out of the set of positioning assistance data are broadcasted in time for the positioning assistance data periodicity, and the rest of the set of positioning assistance data is delayed.

12. A server for assisting a radio network node to handle a set of positioning assistance data for positioning one or more User Equipments, UEs, in a wireless communications network, the server being configured to:

send the radio network node a request to activate a position system information broadcast;

based on importance determine an explicit priority associated to the respective positioning assistance data out of the set of positioning assistance data, wherein the explicit priority is determined for a positioning assistance data in the set of positioning assistance data irrespective of the importance of other positioning assistance data in the set of positioning assistance data, and assist the radio network node by sending the set of positioning assistance data, and information about the determined explicit priority associated to the respective positioning assistance data, which determined explicit priority is adapted to enable the radio network node to determine a schedule for broadcast of at least some of the respective positioning assistance data out of the set of positioning assistance data, in respect to available resources in the radio network node.

13. The server according to claim 12, wherein the importance is adapted to comprise any one or more out of: requirements, importance, time criticality, or necessity for prioritized subscription classes.

14. The server according to claim 12, wherein the priority based on importance is adapted to concern a piece of positioning assistance data information.

15. The server according to claim 12, wherein the priority based on importance is adapted to concern how to prioritize the respective positioning assistance data out of the set of positioning assistance data, to be packed into messages in respect to available resources, and to be broadcasted by the radio network node.

16. A radio network node for handling a set of positioning assistance data for positioning one or more User Equipments, UEs, in a wireless communications network, the radio network node being configured to:

receive, from a server, a request to activate a position system information broadcast;

receive a set of positioning assistance data, and information about an explicit priority associated to the respective positioning assistance data, which explicit priority is related to importance, and information about positioning assistance data periodicity, and based on the received information about the explicit priority and available resources in the radio network node determine a schedule for broadcast of at least some of the respective positioning assistance data out of the set of positioning assistance data wherein, determining a schedule for broadcast comprises determining a schedule for broadcast wherein at least some of the respective positioning assistance data out of the set of positioning assistance data are broadcasted in time for the positioning assistance data periodicity, and the rest of the set of positioning assistance data is delayed.

17. The radio network node according to claim 16, wherein the importance is adapted to comprise any one or more out of: requirements, importance, time criticality, or necessity for prioritized subscription classes.

18. The radio network node according to claim 16, wherein the priority based on importance is adapted to concern a piece of positioning assistance data information.

19. The radio network node according to claim 16, wherein the priority based on importance is adapted to concern how to prioritize the respective positioning assistance data out of the set of positioning assistance data, to be packed into messages in respect to available resources, and to be broadcasted by the radio network node.

* * * * *

UNITED STATES PATENT AND TRADEMARK OFFICE
CERTIFICATE OF CORRECTION

PATENT NO. : 11,632,652 B2
APPLICATION NO. : 16/339066
DATED : April 18, 2023
INVENTOR(S) : Sara Modarres Razavi et al.

It is certified that error appears in the above-identified patent and that said Letters Patent is hereby corrected as shown below:

On the Title Page

Item (73), Assignee:
Please correct "TELEFONAKTIEBOLAGET L M ERICSSON, Stockholm, Sweden" to read
– TELEFONAKTIEBOLAGET L M ERICSSON (PUBL), Stockholm, Sweden –

Signed and Sealed this
Twentieth Day of August, 2024

Katherine Kelly Vidal
*Director of the United States Patent and Trademark Office*